(No Model.)
D. E. NORTON.
BICYCLE, TRICYCLE, &c.
No. 584,888. Patented June 22, 1897.
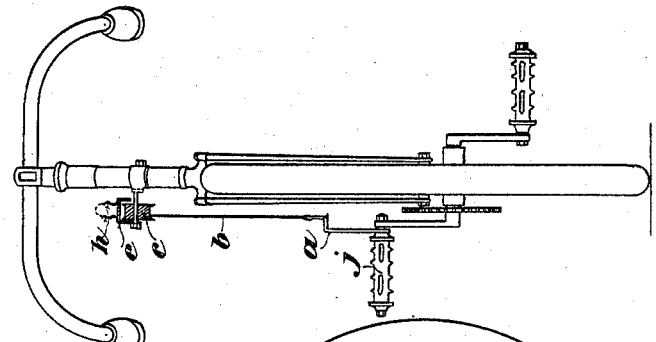
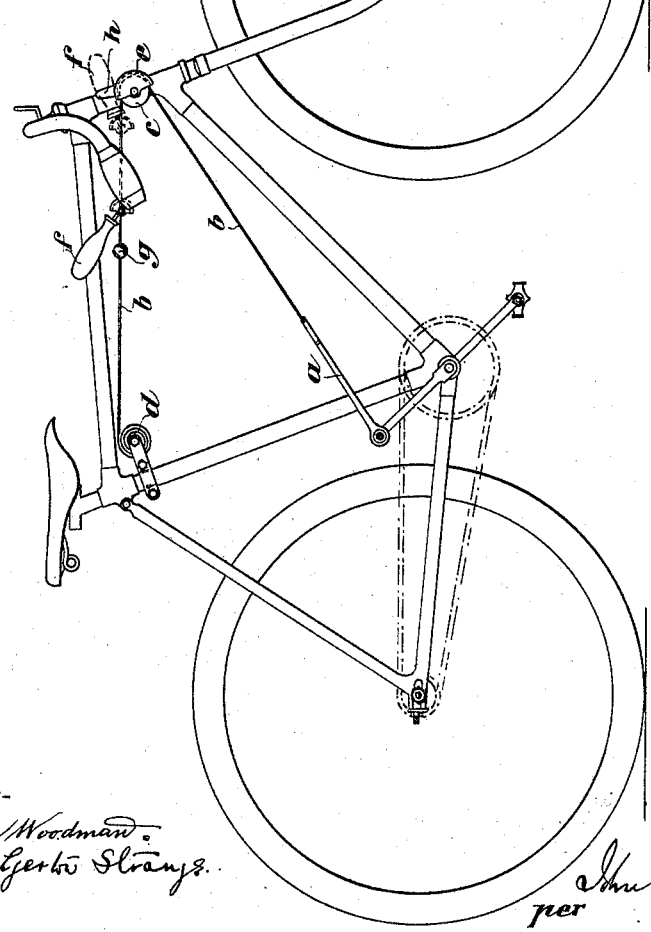
Witnesses:—
Arthur Woodman.
Charles Gerto Strange.
Inventor
Downes E. Norton.
per John P. O'Donnell
Attorney.

UNITED STATES PATENT OFFICE.

DOWNES ELLAND NORTON, OF LONDON, ENGLAND.

BICYCLE, TRICYCLE, &c.

SPECIFICATION forming part of Letters Patent No. 584,888, dated June 22, 1897.

Application filed September 14, 1896. Serial No. 605,812. (No model.)

*To all whom it may concern:*

Be it known that I, DOWNES ELLAND NORTON, a subject of the Queen of Great Britain and Ireland, residing at Laurel Dene, Hampton Hill, London, in the county of Middlesex, England, have invented certain new and useful Improvements in Bicycles, Tricycles, and the Like; and I do hereby declare that the following is a full, clear, and exact description of the invention, which will enable others skilled in the art to which it appertains to use the same.

The object of my invention is to increase the speed of bicycles, tricycles, and the like by providing means whereby one hand (or both, if necessary) may be utilized for assisting the movement of the crank and pedal driving the hind wheel of the machine.

I employ on the outside of the crank and loosely connected to the spindle of the pedal another crank or lever connected by any pliable connection, such as chain or wire over a pulley centered in a support on the front fork of the machine, to a spring-drum preferably fixed near the junction of the back-wheel fork with the central member of the frame which supports the saddle-pin, a suitable handle being provided on the pliable connection for operation by the rider, such handle being capable of being moved clear of the rider's leg when my auxiliary driving device is not required to be operated by hand. The spring-drum above referred to keeps the pliable connection to the crank taut and also assists the upward movement of the crank.

In order that my invention may be better understood and more readily carried into effect, I will describe it with reference to the accompanying drawings, in which—

Figure 1 is a side elevation of a bicycle, showing the attachment of my auxiliary driving mechanism, the near pedal being removed to better show the connection to the spindle of the pedal. Fig. 2 is a front view of Fig. 1.

The same letters refer to the same parts in the two figures.

$a$ is the crank or lever, attached at one end to the spindle of the pedal and at the other end to the one end of the pliable connection $b$ which is taken round the pulley $c$, preferably fixed to the front pillar of the machine. The other end of the pliable connection $b$ is attached to the spring-drum $d$, centered in a support which may be clamped or otherwise fixed to the frame of the machine. The drum $d$ by means of its spring tends to wind up the connection $b$ and keep it taut.

$e$ is the sheaf or bracket of the pulley $c$, which also acts as a guide to prevent the connection being jerked off the pulley.

$f$ is the handle on the connection $b$, which when operated by the rider engages with a stop $g$, which is in the form of a ball, a corresponding cup being provided on the end of the handle $f$.

$h$ are clips for holding the handle $f$ firmly when it is not required to be operated by the rider, as hereinafter described.

In Fig. 2 the pulley $c$ is shown in section.

I will now describe the action of my invention, as follows: In driving bicycles not provided with my invention as above described when the pedal (for example, $j$, Fig. 2) is at its lowest position and the foot is moving upward no assistance is given to the driving of the bicycle by that pedal. With my invention, however, when it is desired to assist the driving of the bicycle by hand the rider by grasping the handle $f$ and pulling it toward him forces, by means of the connection $b$ and lever $a$, a rapid upward movement of the pedal $j$ and the crank to which it is attached, the foot of the rider again coming into operation to depress the pedal in the usual way. When it is desired to discontinue the auxiliary driving by hand, the handle $f$ is moved forward toward the front fork of the machine and pressed between the clips $h$, which hold it firmly, the pliable connection $b$ being free to move freely to and fro through the cup on the end of said handle.

It is obvious that when the hand is not pulling the connection to assist the upward movement of the crank the spring-drum $d$, to which the end of the connection $b$ is attached, will itself give such assistance, the said connection in its movement toward the rider being automatically wound round the drum $d$.

Provision can be made for a connection to each crank and pedal, so that assistance can be given to the driving of the machine by either hand.

Having now fully described my invention, what I claim, and desire to secure by patent, is—

The combination, with a velocipede provided with a driving-crank, of a pulley $c$ and a clip $h$ carried by the front part of the frame, a take-up spring carried by the rear part of the frame, a flexible connection attached to the said spring and crank and passing over the pulley $c$ and provided with a ball $g$ between the said spring and pulley, and a handle engaging with the ball $g$ and supported by the clip $h$ when not in use, substantially as set forth.

DOWNES ELLAND NORTON.

Witnesses:
WILLIAM H. LEWEN,
WILLIAM J. THORN.